United States Patent
Woytowich et al.

(10) Patent No.: US 7,959,790 B2
(45) Date of Patent: Jun. 14, 2011

(54) METHOD AND ELECTRODE CONSTRUCTION FOR ELECTRO-COAGULATION TREATMENT OF WATER AND WASTE WATER

(76) Inventors: David Lorne Woytowich, Sanford (CA);
Daniel Robert Oger, Winnipeg (CA);
Ronald Bruce Oger, Dugald (CA);
Christopher Paul Marino Davie, Warren (CA)

( * ) Notice: Subject to any disclaimer, the term of this patent is extended or adjusted under 35 U.S.C. 154(b) by 1470 days.

(21) Appl. No.: 10/412,759

(22) Filed: Apr. 11, 2003

(65) Prior Publication Data

US 2003/0222030 A1 Dec. 4, 2003

Related U.S. Application Data

(60) Provisional application No. 60/372,435, filed on Apr. 16, 2002, provisional application No. 60/420,332, filed on Oct. 23, 2002.

(51) Int. Cl.
*C02F 1/463* (2006.01)
(52) U.S. Cl. ........ 205/757; 205/628; 205/637; 204/237; 204/269
(58) Field of Classification Search .................. 205/757, 205/637, 628; 204/237, 269
See application file for complete search history.

(56) References Cited

U.S. PATENT DOCUMENTS

| | | | |
|---|---|---|---|
| 2,687,996 A | 8/1954 | Butler | |
| 3,871,989 A | 3/1975 | King | |
| 4,872,959 A * | 10/1989 | Herbst et al. | 205/566 |
| 5,085,753 A * | 2/1992 | Sherman | 204/267 |
| 5,108,563 A | 4/1992 | Cook | |
| 5,401,374 A | 3/1995 | Leutwyler | |
| 5,439,567 A | 8/1995 | Cook | |
| 5,928,493 A | 7/1999 | Morkovsky et al. | |
| 5,980,727 A * | 11/1999 | Putz et al. | 205/688 |
| 6,139,710 A | 10/2000 | Powell | |
| 6,294,061 B1 | 9/2001 | Morkovsky et al. | |
| 6,582,592 B2 * | 6/2003 | Arnaud | 210/96.1 |

* cited by examiner

*Primary Examiner* — Arun S Phasge
(74) *Attorney, Agent, or Firm* — Adrian D. Battison; Ade & Company

(57) ABSTRACT

An improved method for the electro-coagulation c treatment of water and waste water includes an electrolytic cell having an anode and a helical cathode mounted longitudinally within a duct for receiving the contaminated water or waste water at one end and for discharging the treated water and electro-coagulated precipitates at the other end. The electro-coagulated precipitates can be subsequently separated by conventional flocculation, settlement and filtration systems. The anode forms a central longitudinal sacrificial rod defining a cylindrical outer surface and the helical cathode comprises an elongate wire coiled helically around and along the anode so as form a plurality of turns of the wire which turns are wrapped around the anode surface in the form of a constant helix of constant diameter with the turns spaced each from the next and spaced from the anode surface.

34 Claims, 3 Drawing Sheets

METHOD AND ELECTRODE CONSTRUCTION FOR ELECTRO-COAGULATION TREATMENT OF WATER AND WASTE WATER

This application claims priority under 35 U.S.C. 119 from Provisional Application Ser. No. 60/372,435, filed Apr. 16, 2002 and Provisional Application Ser. No. 60/420,332 filed Oct. 23, 2002.

This invention relates to a method and electrode construction for the electro-coagulation treatment of water and waste water.

BACKGROUND OF THE INVENTION

Treatment of water and waste water by electro-coagulation is well known as a process by which contaminant particles can be coagulated to form precipitates which can be subsequently separated using conventional flocculation, settlement or filtration systems.

Conventional coagulation is a chemical process in which the charged particles in colloidal suspension are neutralized by mutual collisions with counter ions. After the particle is neutralized, it will attract to other colloidal particles and agglomerate to form precipitates. It is generally accepted that coagulation occurs because of a reduction of the net surface charge of the particle to a point where electrostatic repulsive forces are reduced, then allowing van der Walls forces to dominate and allow particle agglomeration. Agglomerated particles could be separated by a conventional separation technique such as settling clarification tanks. Chemicals have been used to coagulate contaminants in both water and waste water treatment systems. These chemicals are not only costly; they also contribute secondary pollution to the environment.

Electro-coagulation is an electrical process in which a pair of electrodes are used to neutralize small charged particles in colloidal suspension. The electrodes (anode and cathode) are subjected to a specific current density. Upon oxidation, the anodes are oxidized and form metal ions (either $Fe^{+2}$, $Fe^+$ or $Al^{+3}$) in solution that react with hydroxide ($OH^-$) anions created in the electro-coagulation process. This leads to the formation of metal hydroxide ions, either cationic or anionic species depending on the pH of the waste water. A combination of inert anodes and metal (titanium) cathodes can also be used. The inert electrodes accomplish pollutant destabilization utilizing the transfer of electrons within the electrolyte. The transfer of electrons and formation of protons ($H^+$) created in the electro-coagulation process can effectively destabilize a range of metal and organic pollutant species.

Under appropriate conditions, various forms of charged hydroxyl ($OH^-$) and $Al^{+3}$ species might be formed. These gelatinous hydroxo cationic/anionic complexes can effectively destabilize pollutants by adsorption and charge neutralization by enmeshment of the particle, thus forcing it to react with a counter ion. Pollutants are also destabilized by ions of opposite charge ($e^-$ and $p^+$) produced during electro-coagulation. Particles that undergoing destabilization, will agglomerate due to the attractive van der Wall forces and form into a stable precipitate which could then be separated by conventional separation technique. Typical chemical reactions at both the aluminium anode and cathode are shown below:

Anode:

$$Al_{(s)} \rightarrow Al^{3+}_{(aq)} + 3e^- \text{ (lose electrons)}$$

$$Al^{3+}_{(aq)} + 3H_2O \rightarrow Al(OH)_3 + 3H^+$$

$$nAl(OH)_3 \rightarrow Al_n(OH)_{3n}$$

Cathode:

$$2H_2O + 2e^- \rightarrow H_{2(g)} + 2OH^-$$

$$Al^{3+} + 3e^- \rightarrow Al_{(s)} \text{ (gain electrons)}$$

The electrochemical dissolution of the aluminum anode produces $Al^{3+}$ ions which further react with $OH^-$ ions (from cathode), transforming $Al^{3+}$ ion initially into $Al(OH)_3$ and then into the gelatinous hydroxyl precipitate ($Al_n(OH)_{3n}$). Depending on the pH of the aqueous medium, different ionic species will also be formed in the medium such as: $Al(OH)^{2+}$, $Al_2(OH)_2^{2+}$, and $Al(OH)_4$. At the cathode, hydrogen ($H_2$) gas and hydroxide ($OH^-$) ions are formed from the division of $H_2O$ and dissolved metals are reduced to their elemental state.(i.e. $Al^{+3}$).

The electrochemical dissolution of the iron anode produces iron hydroxide, $Fe(OH)_n$ where n=2 or 3. There are two proposed mechanisms for the production of the iron hydroxide. Like the gelatinous aluminum hydroxyl precipitate ($Al_n(OH)_{3n}$), the iron hydroxide precipitate ($Fe(OH)_n$) formed remains in the aqueous medium (stream) as a gelatinous suspension. This suspension can also remove water and waste water contaminants either by complexation or by electrostatic attraction, followed by coagulation. The cathode is subject to scale formation, which can impair the operation of the system. Typical chemical reactions at both the iron anode and cathode are shown below:

Anode:

$$4Fe_{(s)} \rightarrow Fe^{2+}_{(aq)} + 8e^- \text{ (lose electrons)}$$

$$4Fe^{2+}_{(aq)} + 10H_2O_{(l)} + O_{2(g)} \rightarrow 4Fe(OH)_{3(s)} + 8H^+_{(aq)}$$

Cathode:

$$8H^+(aq) + 8e^- \rightarrow 4H_2(g)$$

Overall:

$$4Fe_{(s)} + 10H_2O_{(l)} + O_{2(g)} \rightarrow 4Fe(OH)_{3(s)} + 4H_{2(g)}$$

Anode:

$$Fe_{(s)} \rightarrow Fe^{2+}_{(aq)} + 2e^- \text{ (lose electrons)}$$

$$Fe^{2+}_{(aq)} + 2OH^-_{(aq)} \rightarrow FeOH_{2(s)}$$

Cathode:

$$2H_2O_{(l)} + 2e^- \rightarrow H_{2(g)} + 2OH^-_{(aq)}$$

Overall:

$$Fe_{(s)} + 2H_2O_{(l)} \rightarrow Fe(OH)_{2(s)} + H_{2(g)}$$

Electro-Coagulation Treatment (ECT) Systems

Utilizing electro-coagulation treatment (ECT) systems to treat waste water was practised through most of the 20$^{th}$ century with limited success. Within the last decade, technological advances in ECT systems has proved that it is an effective treatment method, brought on partially by increased environmental regulations and environmental awareness. ECT is used to remove a variety of water and waste water contaminants such as heavy metal ions (chromium, zinc, silver), suspended solids and small colloids (greases and oils). Typically, the ECT system must have optimized operational parameters (pH, current density, and temperature)

Examples of such electro-coagulation systems are shown in U.S. Pat. No. 6,139,710 (Powell) issued Oct. 31, 2000, U.S. Pat. Nos. 6,294,061 and 5,928,493 (Morkovsky) assigned to Kaspar Electroplating and issued Sep. 25, 2001 and Jul. 27, 1999, and in U.S. Pat. Nos. 5,439,567 and 5,108,563 (Cook) assigned to Environmental Systems and issued Aug. 8, 1995 and Apr. 28, 1992 respectively.

Many such systems use parallel plates as the necessary electrodes. Cook discloses an arrangement in which a central rod forms an anode and the cathode is defined by a surrounding sleeve which is perforated with a series of holes so as to allow the water to enter the area inside the cylindrical cathode so as to be acted upon between the anode and the cathode.

One significant problem which arises with continuous flow ECT systems is treating a sufficient rate of flow of water and waste water at reasonable cost, while at the same time preventing the system from clogging due to the formation of precipitates and corrosion scale deposited on the cathode.

It is essential therefore for continuous flow that the arrangement of the cathode and anode, herein referred to as the electrolytic cell, be in effect self cleaning in that the flow of liquid is sufficient to carry with it the coagulated precipitates while allowing treatment of the liquid at a sufficient efficiency to remove the contaminants.

Up till now there has been no suitable design of an electrolytic cell which provides an adequate treatment of the water and waste water to continuously remove the contaminants while at the same time preventing fowling of the cell. Once fowling commences, this builds up until the cell becomes clogged. There is at this time no effective way to self-clean the cell once the coagulation of particles has commenced. While electro-coagulation is therefore known and accepted in principle, its commercial continuous flow application has been limited by this problem.

SUMMARY OF THE INVENTION

It is one object of the present invention to provide an improved electro-coagulation treatment (ECT) system for removing contaminants from water and waste water and primarily to provide a novel electrolytic cell construction therefor.

According to a first aspect of the invention there is provided a method for the electro-coagulation treatment of contaminated water and waste water comprising:
  providing an electrolytic cell including an anode and a helical cathode;
  causing the contaminated water or waste water to come into contact with the cell;
  applying a DC voltage across the anode and helical cathode of the cell so as to cause a current flow through the water so as to cause coagulation of contaminant particles to form precipitates;
  and extracting the coagulated precipitates from the water;
  wherein the anode forms a central longitudinal member defining an outer anode surface surrounding the axis and extending along an axis of the cell and the helical cathode comprises an elongate member coiled helically around and along the anode so as to form a plurality of turns of the elongate member which turns are wrapped around the anode surface, are spaced each from the next and are spaced from the anode surface.

Preferably the turns are of equal diameter so that the turns lie in a circular cylindrical shape surrounding the anode surface. However it is not essential that either the anode or the helical cathode are of constant diameter along their length and other varying shapes may be employed if required.

Preferably the turns are equally spaced each from the next to form a helix of constant pitch. However variations in pitch are also possible to accommodate changes in voltage along the cell or to provide different current density at required different locations in the cell.

Preferably the anode surface is circular cylindrical in shape and is formed from a rod of a suitable sacrificial material such as iron or aluminum.

Preferably the elongate member forming the helical cathode is circular in cross-section and is of constant cross section.

Preferably the cell is located longitudinally within a duct and the water or waste water is caused to flow along the duct. In this arrangement, the helical cathode is spaced from an inside surface of the duct such that the water is caused to flow between the helical cathode and the anode and between the helical cathode and the inside surface. Preferably the helical cathode is spaced from an inside surface of the duct by a plurality of spacers arranged at specific angular locations around the helical cathode and duct attached to the helical cathode so as to bridge at least two turns of the elongate member.

However the cell can also be used in some cases with transverse flow or by simple immersion within water contained within a settlement tank.

In most cases, the electrolytic cell t causes electro-coagulation of the contaminants in the water and waste water so that the treated effluent and coagulated precipitates are transferred from an outlet of the duct to a flocculation or clarification tanks where the coagulated precipitates are separated. Separation can be effected simply by settlement in a suitable settling tank or may be accelerated by use of well know flocculating agents.

When flowing through the cell within a duct, a portion of the water and coagulated contaminant particles is optionally returned from the outlet of the duct to an inlet of the duct to maintain a predetermined flow through the duct.

Preferably each end of the anode and each end of the elongate member forming the cathode is connected to a source of DC voltage so that the voltage along the length of the cell and thus the current density in the cell is maintained as constant as possible without significant drop off at one end of the cell.

The current density necessary to effect the necessary treatment on the contaminants in the water varies widely depending upon many factors including the amount of contaminants, the type of contaminants, the removal efficiencies, the rate of flow and the characteristics of the water and waste water. The size of the anode and the dimensions of the cathode thus can vary widely dependent upon these characteristics and the necessary trials to determine a particularly suitable construction for particular characteristics can be readily determined by simple trial. However the following dimensions are provided as to typical characteristics:

Preferably, the diameter of the anode lies in the range of 25 mm to 300 mm.

Preferably, the diameter of the elongate member forming the cathode lies in the range of 3 mm to 25 mm.

Preferably, the spacing between the anode and the cathode lies in the range of 2 mm to 10 mm.

Preferably, the spacing between the turns of the elongate member forming the cathode lies in the range of 2 mm to 20 mm.

Preferably, the current density lies in the range of 50 watts to 2000 watts.

According to a second aspect of the invention there is provided an electrode construction for electrolytic treatment of contaminated water or waste water comprising:
  an anode and a helical cathode;
  the anode and the helical cathode being connected to a source of a DC voltage for applying a voltage there across;

wherein the anode forms a central longitudinal member defining an outer anode surface surrounding the axis and extending along an axis of the cell;

and the helical cathode comprises an elongate member coiled helically around and along the anode so as form a plurality of turns of the elongate member which turns are wrapped around the anode surface, are spaced each from the next and are spaced from the anode surface.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

It has been found surprisingly that the provision of a helical cathode in the form of a helically wound coil of a wire or rod of circular cross section provides an arrangement in which the cell is automatically self-cleaning in that the coagulated precipitates are carried from the cell by the flow of the water. At the same time the arrangement provides an adequate level of treatment of the contaminated water and waste water to provide the necessary coagulation by which the coagulated precipitates can be subsequently extracted using conventional flocculation, settlement or filtration systems.

Figure 3:
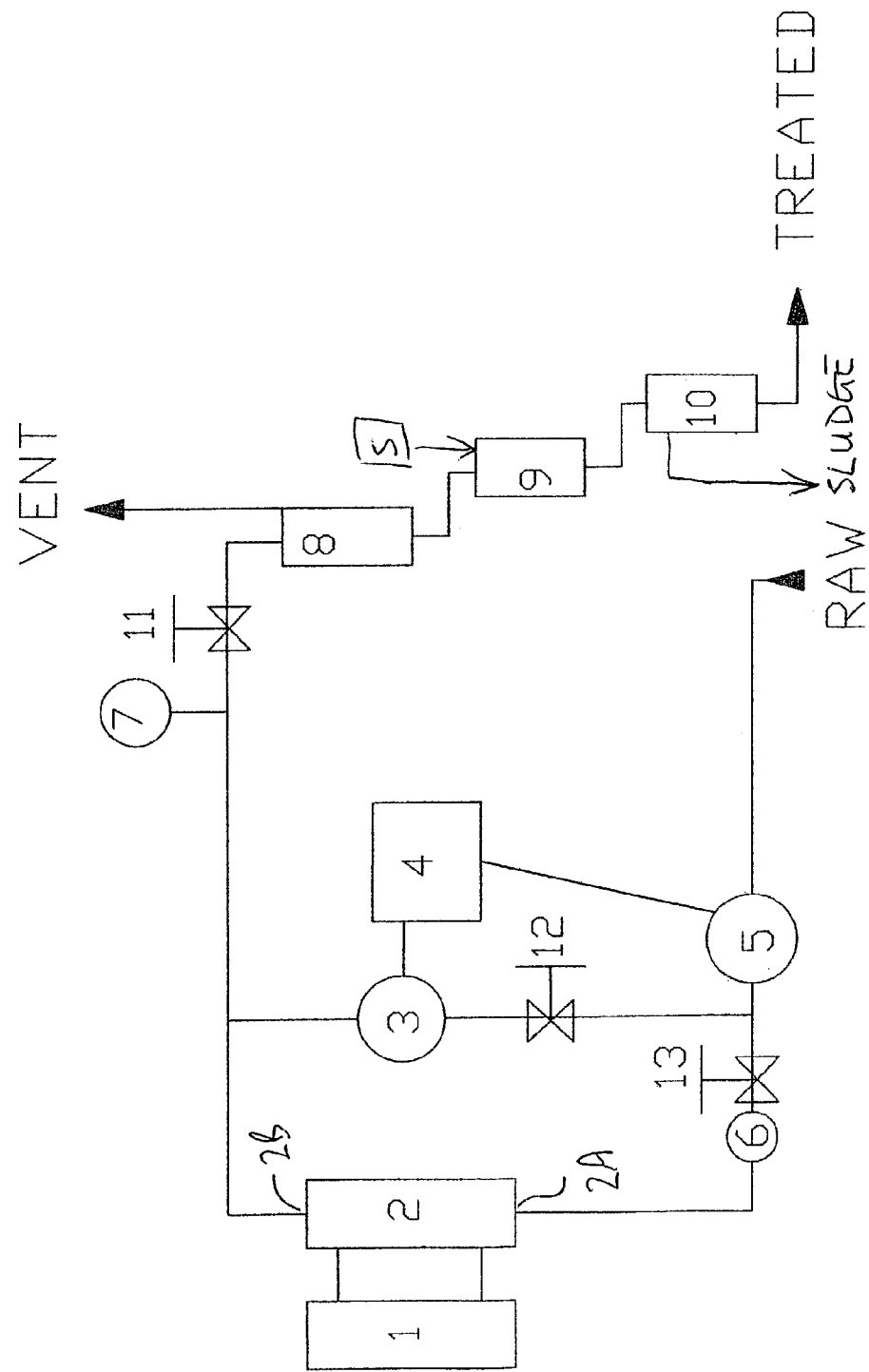
FIG. 3 is a block diagram showing the components of the ECT system.

In FIG. 3 is shown the electro-coagulation treatment (ECT) system for water and f waste water supplied from a supply indicated at RAW and the water passes through the treatment path to a discharge of treated water indicated at TREATED.

The ECT system includes the electrolytic t cell 2 which is powered by a DC power supply 1. A supply pump 5 pumps the water from the source under pressure through a valve 13 and a flow meter 6 into one end of the reaction chamber 2 containing the cell. Thus the pumped contaminated water enters a lower end 2A of the reaction chamber and departs an upper end 2B of the reaction chamber. From the upper end of the reaction chamber, the water containing the contaminants is carried under pump pressure through the pressure gauge 7 and a valve 11 to a de-gasifier 8, a mixing chamber 9 and a clarification chamber 10. The de-gasifier 8 includes a vent by which gas generated in the treatment can be discharged to atmosphere or to collection if required.

In the mixing chamber 9 can be added conventional flocculating agents from a supply S for mixing with the d electrocoagulated water and waste water within the mixing chamber 9. After mixing the coagulated precipitates and flocculating agents are supplied to a larger collection and settling chamber 10 in which clarification occurs by settlement supplying treated water and effluent in a treated stream and sludge in a sludge stream.

The de-gasifier, mixing chamber and clarification system are of a conventional nature. Other methods known to one skilled in the art can be provided for extracting the coagulated precipitates from the treated stream such as conventional flocculation, settlement or filtration systems. Conventional techniques can be provided for de-watering and drying the sludge.

In many cases the sludge from an electro-coagulation treatment (ECT) system treating an industrial waste water is non-hazardous so that it can simply be discarded in a municipal landfill. The contents and nature of the sludge of course depend upon the contaminants within the water and waste water supply stream. Preliminary test results from the ECT system shown in FIG. 3 show that the sludge containing high concentrations of chromium contaminants are non-hazardous, having passed the Canadian General Standards Board (CGSB) Leachate Procedure (EPA SW-846 Method 1310A L). However heavy metal contaminants such as chromium are often extracted into a sludge which is non-hazardous due to the chemical action within the electrolytic cell, which is itself well known to one skilled in the art.

In order to maintain a constant flow through the reaction chamber 2 despite potential variation in supply rate through the pump 5, there is provided a re-cycle pump 3 in a line parallel to the reaction chamber and carrying recycle materials from the upper outlet 2B back to the inlet 2A of the reaction chamber. The pumps 3 and 5 are controlled by a control unit 4 to maintain the required constant flow of the contaminated and recycled water over the cell within the reaction chamber.

Figure 1:
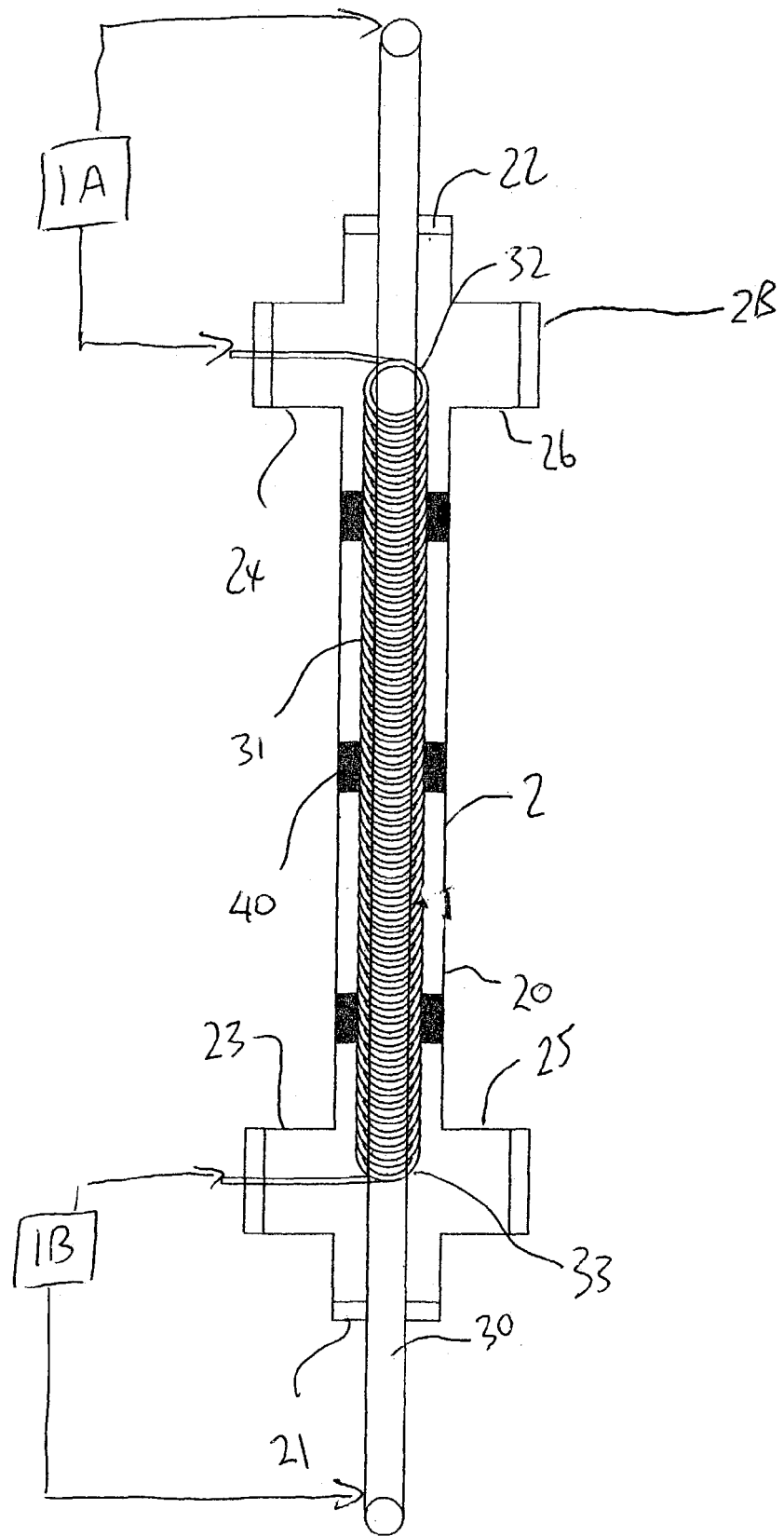
FIG. 1 is a schematic illustration of an electrolytic cell for use in a electro-coagulation treatment (ECT) t system.
Figure 2:
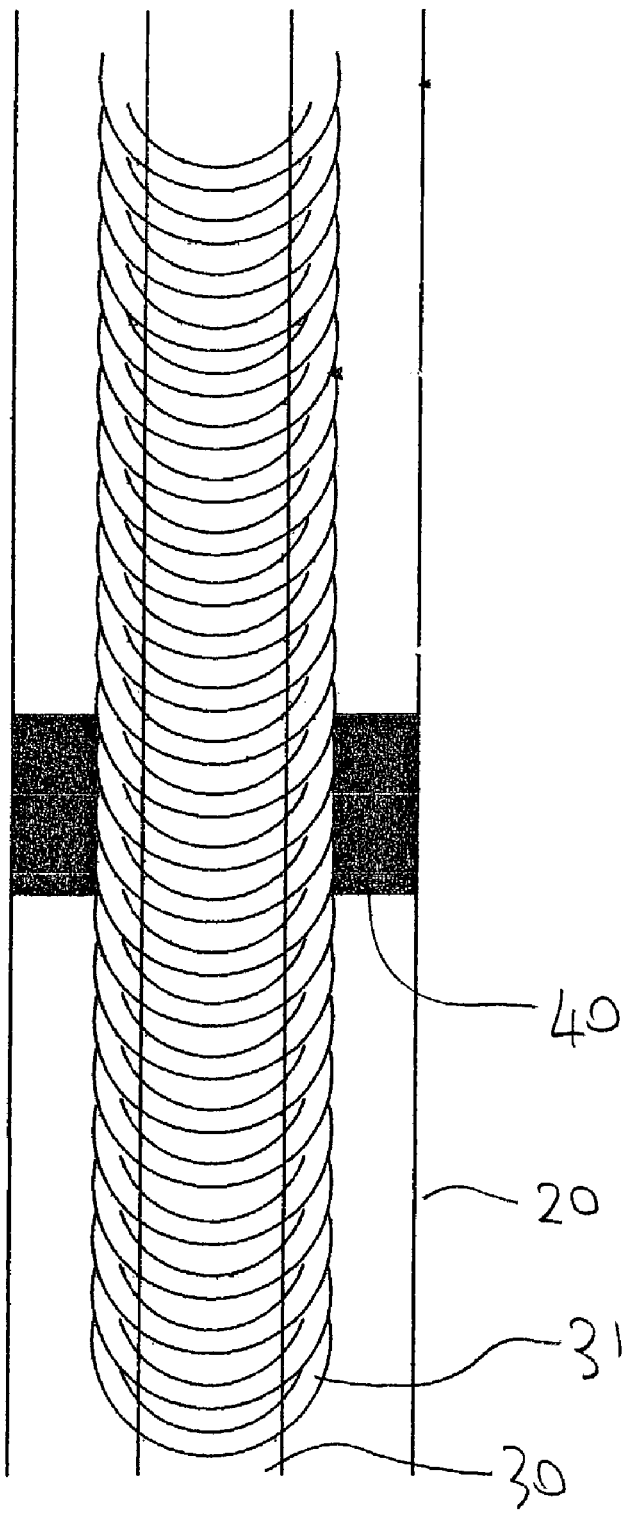
FIG. 2 is a view of one portion of FIG. 1 on an enlarged scale.

Turning now to FIGS. 1 and 2, the electrolytic cell construction is shown in detail. This comprises a chamber 2 in the form of a pipe 20 having closed ends 21 and 22. Adjacent the end 21 is provided a pair of right angle couplings 23 and 25 and adjacent the end 22 is provided a similar pair of right angle couplings 24 and 26. Each of the couplings 23 and 24 is plugged. The coupling 25 provides the inlet 2A and the coupling 26 provides the outlet 2B. Thus water and waste water to be treated enters the coupling 25 and passes along the pipe 20 to the coupling 26. An anode 30 in the form of an elongate rod passes through the plugs 21 and 22 and thus lies in fixed position along the axis of the pipe 20. The anode is formed from a suitable sacrificial material such as iron, aluminum, or the like which provides ions in an electrolytic action when a voltage is applied between the anode and the cathode.

The helical cathode is formed by a helical coil of wound wire. The wire is carefully wound to form a helix of constant diameter and constant pitch so that the wire turns are spaced each from the next. The inside diameter of the helix is such that it is spaced from the cylindrical outside surface of the anode 30. The outside diameter of the helix is such that it is spaced from the inside surface of the pipe 20.

The helix 31 is continuous from an upper end 32 to a lower end 33. The upper end 31 is aligned with the right angled connector 24 so that an end of the wire forming the helix extends through the plug in the connector 24 to provide an exposed portion outside the chamber. Similarly the lower end of the wire at the lower end 33 extends through the compression fitting in the connector 23.

The power supply 1 includes two separate power supply components each generating a predetermined voltage difference which is applied across the respective ends of the anode and cathode. Thus a power supply portion 1A applies a voltage between the upper end of the anode 30 and the upper end of the helical cathode. Similarly the power supply portion 1B provides a voltage across the lower end of the anode 30 and the exposed lower end of the cathode.

The length of the anode and the cathode and thus the length of the pipe 20 between the connectors is arranged so that the voltage across the anode and cathode along the full length thereof remains substantially constant or at least does not drop to a level at which the current density is insufficient to effect proper water treatment.

The helix is supported within the pipe 20 by a plurality of spacers 40. The spacers are formed by short lengths of wire which are welded parallel to the axis of the helix at angularly spaced positions around the helix so that each spacer is welded to 2 or more turns of the helix. Thus the helix is held against longitudinal spring action and is also held against side to side movement. The spacers have a diameter sufficient that they are in sliding fit with the inside surface of the pipe. Generally four such spaces are used around the axis at 90° spacing so as to maintain the helix centered around the axis of the pipe. However the spacers do not interfere with the longitudinal flow of water along the pipe both inside the helix and outside the helix. The number of spaces along the length of the helix depends upon the length of the helix and the number of turns and the gauge of the wire used to form the helix but as shown there are four sets of spacers arranged at axially spaced positions along the length of the helix.

As set forth hereinbefore, the operation of the cell is to cause electro-coagulation of the contaminants within the water while at the same time ensuring that all of the particles so coagulated are carried in the stream out of the cell and out of the outlet 2B for further treatment. It has been surprisingly found that the construction of cells set forth above in which the water can flow both outside and inside the helical cathode provides adequate treatment of the contaminants while at the same time ensuring that no coagulated particles commence to collect at any point within the cell.

It is believed that the helical formation of the cathode at which the particles would normally collect ensures that there are no surfaces with suitable sites for collection to commence since the whole length of the cathode is formed from a continuous wire wound into helical form. At the same time the wire, even though it leaves spaces between the turns, provides adequate treatment of the water in the electrolytic action. The water and waste water acts as an electrolyte between the anode and cathode in the cell which in turn allows for the formation of the coagulated precipitates.

Preliminary ECT Pilot Plant Study Results

A pilot plant study utilizing the electro-coagulation treatment system (ETS) described in FIG. 3 was undertaken to treat a chromic acid rinse waste water. The pilot study involved the on-site pre-treatment of approximately 10,000 liters of this industrial waste water. The primary goal of the pilot plant study was to optimize and evaluate a new continuous-flow electro-coagulation treatment system (ETS) in removing Chromium to levels below 5 mg/L in the treated effluent. Specific objectives include: (1) to optimize the ETS at various influent flow rates and re-circulation flow rates; and (2) to determine average heavy metal removal efficiencies. The experimental treatment trials include recirculation (Trials 1 and 2) and non-recirculation Trials 3 and 4)

I. Experimental Treatment Trial 1

A. System Parameters

1. The inlet flow rate was set at 9L/min.
2. The re-circulation flow rate was set at 9L/min.
3. Total treatment time for Trial 1 was 2.5 hours.

B. pH and Temperature Results

1. The raw waste water temperature was 18 degrees C.
2. The rapid mix chamber temperature was 20 degrees C.
3. The slow mix chamber temperature was 20 degrees C.
4. The settling tank temperature after 2 hours was 20 degrees C.
5. The raw waste water pH was 7.6
6. The waste water pH in the rapid mix chamber was 8.3
7. The waste water pH in the slow mix chamber was 8.4
8. The waste water pH in the settling tank was 8.3

C. Heavy Metal Analysis Results

| Parameter | JR #1 (raw) | Units | ETS-1 | % Removal Efficiency | Date Analyzed |
|---|---|---|---|---|---|
| Aluminum | 3.6 | mg/l | 0.08 | 97.8 | Sep. 30, 2002 |
| Antimony | 0.01 | mg/l | 0.005 | 50.0 | Sep. 30, 2002 |
| Arsenic | 0.0247 | mg/l | 0.0021 | 91.5 | Sep. 30, 2002 |
| Barium | 0.0431 | mg/l | 0.0012 | 97.2 | Sep. 30, 2002 |
| Beryllium | <0.001 | mg/l | <0.001 | N/A | Sep. 30, 2002 |
| Bismuth | 0.0003 | mg/l | <0.0001 | N/A | Sep. 30, 2002 |
| Boron | 1.62 | mg/l | 1.35 | 16.7 | Sep. 30, 2002 |
| Cadmium | 0.0071 | mg/l | 0.0003 | 95.8 | Sep. 30, 2002 |
| Calcium | 30.5 | mg/l | 5.6 | 81.6 | Sep. 30, 2002 |
| Cesium | 0.0004 | mg/l | 0.0002 | 50.0 | Sep. 30, 2002 |
| Chromium | 86.8 | mg/l | 1.03 | 98.8 | Sep. 30, 2002 |
| Cobalt | 0.0109 | mg/l | 0.0028 | 74.3 | Sep. 30, 2002 |
| Copper | 0.384 | mg/l | 0.034 | 91.1 | Sep. 30, 2002 |
| Iron | 1.64 | mg/l | 1.48 | 9.8 | Sep. 30, 2002 |
| Lead | 0.102 | mg/l | 0.0015 | 98.5 | Sep. 30, 2002 |
| Lithium | 0.01 | mg/l | <0.01 | N/A | Sep. 30, 2002 |
| Magnesium | 6.26 | mg/l | 2.55 | 59.3 | Sep. 30, 2002 |
| Manganese | 0.638 | mg/l | 0.0331 | 94.8 | Sep. 30, 2002 |
| Mercury | 0.0004 | mg/l | | N/A | Sep. 30, 2002 |
| Molybdenum | 0.0228 | mg/l | 0.0445 | N/A | Sep. 30, 2002 |
| Nickel | 0.094 | mg/l | 0.039 | 58.5 | Sep. 30, 2002 |
| Phosphorus | 11.6 | mg/l | 0.27 | 97.7 | Sep. 30, 2002 |
| Potassium | 102 | mg/l | 98 | 3.9 | Sep. 30, 2002 |
| Rubidium | 0.0161 | mg/l | 0.0153 | 5.0 | Sep. 30, 2002 |
| Selenium | <0.001 | mg/l | <0.001 | N/A | Sep. 30, 2002 |
| Silver | 0.001 | mg/l | <0.001 | N/A | Sep. 30, 2002 |
| Sodium | 122 | mg/l | 117 | 4.1 | Sep. 30, 2002 |
| Strontium | 0.162 | mg/l | 0.0151 | 90.7 | Sep. 30, 2002 |
| Tellurium | <0.001 | mg/l | <0.001 | N/A | Sep. 30, 2002 |
| Thallium | <0.0001 | mg/l | <0.0001 | N/A | Sep. 30, 2002 |
| Tin-Total | 0.0045 | mg/l | 0.0018 | 60.0 | Sep. 30, 2002 |
| Titanium | 0.128 | mg/l | 0.0031 | 97.6 | Sep. 30, 2002 |
| Tungsten | 0.0157 | mg/l | 0.0093 | 40.8 | Sep. 30, 2002 |
| Uranium | 0.0004 | mg/l | 0.0001 | 75.0 | Sep. 30, 2002 |
| Vanadium | <0.001 | mg/l | <0.001 | N/A | Sep. 30, 2002 |
| Zinc | 0.49 | mg/l | 0.05 | 89.8 | Sep. 30, 2002 |
| Zirconium | 0.0751 | mg/l | 0.0069 | 90.8 | Sep. 30, 2002 |
| pH | 7.6 | | 8.3 | | Sep. 30, 2002 |

II. Experimental Treatment Trial 2

A. System Parameters

1. The inlet flow rate was set at 9L/min.
2. The re-circulation flow rate was set at 9L/min.
3. The total treatment time for trial 2 was 2:45 hours.

B. pH and Temperature Results

1. The raw waste water temperature was 19 degrees C.
2. The rapid mix chamber temperature was 21 degrees C.
3. The slow mix chamber temperature was 21 degrees C.
4. The settling tank temperature after 2 hours was 21 degrees C.
5. The raw waste water pH was 7.6
6. The waste water pH in the rapid mix chamber was 8.6
7. The waste water pH in the slow mix chamber was 8.5
8. The waste water pH in the settling tank was 8.2

C. Heavy Metal Analysis Results

| Parameter | JR #1 (raw) | Units | ETS-2 | % Removal Efficiency | Date Analyzed |
|---|---|---|---|---|---|
| Aluminum | 3.6 | mg/l | 0.21 | 94.2 | Oct. 2, 2002 |
| Antimony | 0.01 | mg/l | 0.006 | 40.0 | Oct. 2, 2002 |
| Arsenic | 0.0247 | mg/l | 0.0025 | 89.9 | Oct. 2, 2002 |
| Barium | 0.0431 | mg/l | 0.0027 | 93.7 | Oct. 2, 2002 |
| Beryllium | <0.001 | mg/l | <0.001 | N/A | Oct. 2, 2002 |
| Bismuth | 0.0003 | mg/l | <0.0001 | N/A | Oct. 2, 2002 |

|  | JR #1 (raw) | Units | ETS-2 | % Removal Efficiency | Date Analyzed |
|---|---|---|---|---|---|
| Boron | 1.62 | mg/l | 1.33 | 17.9 | Oct. 2, 2002 |
| Cadmium | 0.0071 | mg/l | 0.0009 | 87.3 | Oct. 2, 2002 |
| Calcium | 30.5 | mg/l | 6.2 | 79.7 | Oct. 2, 2002 |
| Cesium | 0.0004 | mg/l | 0.0002 | 50.0 | Oct. 2, 2002 |
| Chromium | 86.8 | mg/l | 0.436 | 99.5 | Oct. 2, 2002 |
| Cobalt | 0.0109 | mg/l | 0.0023 | 78.9 | Oct. 2, 2002 |
| Copper | 0.384 | mg/l | 0.042 | 89.1 | Oct. 2, 2002 |
| Iron | 1.64 | mg/l | 1.16 | 29.3 | Oct. 2, 2002 |
| Lead | 0.102 | mg/l | 0.0075 | 92.6 | Oct. 2, 2002 |
| Lithium | 0.01 | mg/l | <0.01 | N/A | Oct. 2, 2002 |
| Magnesium | 6.26 | mg/l | 3.74 | 40.3 | Oct. 2, 2002 |
| Manganese | 0.638 | mg/l | 0.0363 | 94.3 | Oct. 2, 2002 |
| Mercury | 0.0004 | mg/l |  | N/A | Oct. 2, 2002 |
| Molybdenum | 0.0228 | mg/l | 0.0417 | N/A | Oct. 2, 2002 |
| Nickel | 0.094 | mg/l | 0.045 | 52.1 | Oct. 2, 2002 |
| Phosphorus | 11.6 | mg/l | 0.24 | 97.9 | Oct. 2, 2002 |
| Potassium | 102 | mg/l | 100 | 2.0 | Oct. 2, 2002 |
| Rubidium | 0.0161 | mg/l | 0.0156 | 3.1 | Oct. 2, 2002 |
| Selenium | <0.001 | mg/l | <0.001 | N/A | Oct. 2, 2002 |
| Silver | 0.001 | mg/l | 0.005 | N/A | Oct. 2, 2002 |
| Sodium | 122 | mg/l | 124 | N/A | Oct. 2, 2002 |
| Strontium | 0.162 | mg/l | 0.0164 | 89.9 | Oct. 2, 2002 |
| Tellurium | <0.001 | mg/l | <0.001 | N/A | Oct. 2, 2002 |
| Thallium | <0.0001 | mg/l | <0.0001 | N/A | Oct. 2, 2002 |
| Tin-Total | 0.0045 | mg/l | 0.0033 | 26.7 | Oct. 2, 2002 |
| Titanium | 0.128 | mg/l | 0.0036 | 97.2 | Oct. 2, 2002 |
| Tungsten | 0.0157 | mg/l | 0.0078 | 50.3 | Oct. 2, 2002 |
| Uranium | 0.0004 | mg/l | 0.0001 | 75.0 | Oct. 2, 2002 |
| Vanadium | <0.001 | mg/l | <0.001 | N/A | Oct. 2, 2002 |
| Zinc | 0.49 | mg/l | 0.08 | 83.7 | Oct. 2, 2002 |
| Zirconium | 0.0751 | mg/l | 0.0026 | 96.5 | Oct. 2, 2002 |
| pH | 7.6 |  | 8.2 |  | Oct. 2, 2002 |

III. Experimental Treatment Trial 3
A. System Parameters
1. The inlet flow rate was set at 9L/min.
2. The total treatment time for trial 3 was 2:52 hours.
B. pH and Temperature Results
1. The raw waste water temperature was 17.5 degrees C.
2. The rapid mix chamber temperature was 19.5 degrees C.
3. The slow mix chamber temperature was 19.5 degrees C.
4. The settling tank temperature after 2 hours was 18 degrees C.
5. The raw waste water pH was 7.6
6. The waste water pH in the rapid mix chamber was 8.4
7. The waste water pH in the slow mix chamber was 8.4
8. The waste water pH in the settling tank was 8.3
9. The waste water pH in the settling tank after 2 hours was 8.3
10. The pH of the decant from the settling tank was?
11. The conductivity of the raw waste water was 0.95 mS/cm
12. The conductivity of the treated effluent was 0.90 mS/cm
C. Heavy Metal Analysis Results

| Parameter | JR #1 (raw) | Units | ETS-3 | % Removal Efficiency | Date Analyzed |
|---|---|---|---|---|---|
| Aluminum | 3.6 | mg/l | 0.05 | 98.6 | Oct. 9, 2002 |
| Antimony | 0.01 | mg/l | 0.004 | 60.0 | Oct. 9, 2002 |
| Arsenic | 0.0247 | mg/l | 0.0028 | 88.7 | Oct. 9, 2002 |
| Barium | 0.0431 | mg/l | 0.0011 | 97.4 | Oct. 9, 2002 |
| Beryllium | <0.001 | mg/l | <0.001 | N/A | Oct. 9, 2002 |
| Bismuth | 0.0003 | mg/l | 0.0001 | N/A | Oct. 9, 2002 |
| Boron | 1.62 | mg/l | 1.35 | 16.7 | Oct. 9, 2002 |
| Cadmium | 0.0071 | mg/l | 0.0003 | 95.8 | Oct. 9, 2002 |
| Calcium | 30.5 | mg/l | 6 | 80.3 | Oct. 9, 2002 |
| Cesium | 0.0004 | mg/l | 0.0001 | 75.0 | Oct. 9, 2002 |
| Chromium | 86.8 | mg/l | 0.914 | 98.9 | Oct. 9, 2002 |
| Cobalt | 0.0109 | mg/l | 0.0022 | 79.8 | Oct. 9, 2002 |
| Copper | 0.384 | mg/l | 0.035 | 90.9 | Oct. 9, 2002 |
| Iron | 1.64 | mg/l | 1.5 | 8.5 | Oct. 9, 2002 |
| Lead | 0.102 | mg/l | 0.0005 | 99.5 | Oct. 9, 2002 |
| Lithium | 0.01 | mg/l | <0.01 | N/A | Oct. 9, 2002 |
| Magnesium | 6.26 | mg/l | 3.06 | 51.1 | Oct. 9, 2002 |
| Manganese | 0.638 | mg/l | 0.0347 | 94.6 | Oct. 9, 2002 |
| Mercury | 0.0004 | mg/l | N/A | N/A | Oct. 9, 2002 |
| Molybdenum | 0.0228 | mg/l |  | N/A | Oct. 9, 2002 |
| Nickel | 0.094 | mg/l | 0.041 | 56.4 | Oct. 9, 2002 |
| Phosphorus | 11.6 | mg/l | 0.2 | 98.3 | Oct. 9, 2002 |
| Potassium | 102 | mg/l | 103 | N/A | Oct. 9, 2002 |
| Rubidium | 0.0161 | mg/l | 0.0156 | 3.1 | Oct. 9, 2002 |
| Selenium | <0.001 | mg/l | <0.001 | N/A | Oct. 9, 2002 |
| Silver | 0.001 | mg/l | <0.001 | N/A | Oct. 9, 2002 |
| Sodium | 122 | mg/l | 127 | N/A | Oct. 9, 2002 |
| Strontium | 0.162 | mg/l | 0.0016 | 99.0 | Oct. 9, 2002 |
| Tellurium | <0.001 | mg/l | <0.001 | N/A | Oct. 9, 2002 |
| Thallium | <0.0001 | mg/l | <0.0001 | N/A | Oct. 9, 2002 |
| Tin-Total | 0.0045 | mg/l | 0.0005 | 88.9 | Oct. 9, 2002 |
| Titanium | 0.128 | mg/l | 0.0005 | 99.6 | Oct. 9, 2002 |
| Tungsten | 0.0157 | mg/l | 0.0069 | 56.1 | Oct. 9, 2002 |
| Uranium | 0.0004 | mg/l | 0.0001 | 75.0 | Oct. 9, 2002 |
| Vanadium | <0.001 | mg/l | <0.001 | N/A | Oct. 9, 2002 |
| Zinc | 0.49 | mg/l | 0.03 | 93.9 | Oct. 9, 2002 |
| Zirconium | 0.0751 | mg/l | 0.0039 | 94.8 | Oct. 9, 2002 |
| pH | 7.6 |  |  |  | Oct. 7, 2002 |

IV. Experimental Treatment Trial 4
A. System Parameters
1. The inlet flow rate was set at 9L/min.
2. The total treatment time for trial 4 was 2:36 hours.
B. pH and Temperature Results
1. The raw waste water temperature was 16.5 degrees C.
2. The rapid mix chamber temperature was 18.5 degrees C.
3. The slow mix chamber temperature was 18.5 degrees C.
4. The settling tank temperature after 2 hours was 18.5 degrees C.
5. The raw waste water pH was 7.6
6. The waste water pH in the rapid mix chamber was 8.4
7. The waste water pH in the slow mix chamber was 8.4
8. The waste water pH in the settling tank was 8.4
9. The waste water pH in the settling tank after 2 hours was 8.4
10. The pH of the decant from the settling tank was?
C. Heavy Metal Analysis Results

| Parameter | Raw | Units | ETS-4 | % Removal Efficiency | Date Analyzed |
|---|---|---|---|---|---|
| Aluminum | 3.6 | mg/l | 0.04 | 98.9 | Oct. 17, 2002 |
| Antimony | 0.01 | mg/l | 0.005 | 50.0 | Oct. 17, 2002 |
| Arsenic | 0.0247 | mg/l | 0.0026 | 89.5 | Oct. 17, 2002 |
| Barium | 0.0431 | mg/l | 0.0016 | 96.3 | Oct. 17, 2002 |
| Beryllium | <0.001 | mg/l | <0.001 | N/A | Oct. 17, 2002 |
| Bismuth | 0.0003 | mg/l | 0.0001 | N/A | Oct. 17, 2002 |
| Boron | 1.62 | mg/l | 1.26 | 22.2 | Oct. 17, 2002 |
| Cadmium | 0.0071 | mg/l | 0.0002 | 97.2 | Oct. 17, 2002 |
| Calcium | 30.5 | mg/l | 6.8 | 77.7 | Oct. 17, 2002 |
| Cesium | 0.0004 | mg/l | 0.0001 | 75.0 | Oct. 17, 2002 |
| Chromium | 86.8 | mg/l | 0.465 | 99.5 | Oct. 17, 2002 |
| Cobalt | 0.0109 | mg/l | 0.0021 | 80.7 | Oct. 17, 2002 |
| Copper | 0.384 | mg/l | 0.033 | 91.4 | Oct. 17, 2002 |
| Iron | 1.64 | mg/l | 0.99 | 39.6 | Oct. 17, 2002 |
| Lead | 0.102 | mg/l | 0.0011 | 98.9 | Oct. 17, 2002 |
| Lithium | 0.01 | mg/l | <0.01 | N/A | Oct. 17, 2002 |
| Magnesium | 6.26 | mg/l | 3.25 | 48.1 | Oct. 17, 2002 |
| Manganese | 0.638 | mg/l | 0.0243 | 96.2 | Oct. 17, 2002 |

-continued

| Parameter | Raw | Units | ETS-4 | % Removal Efficiency | Date Analyzed |
|---|---|---|---|---|---|
| Mercury | 0.0004 | mg/l | N/A | N/A | Oct. 17, 2002 |
| Molybdenum | 0.0228 | mg/l | 0.0373 | N/A | Oct. 17, 2002 |
| Nickel | 0.094 | mg/l | 0.038 | 59.6 | Oct. 17, 2002 |
| Phosphorus | 11.6 | mg/l | 0.23 | 98.0 | Oct. 17, 2002 |
| Potassium | 102 | mg/l | 97.2 | N/A | Oct. 17, 2002 |
| Rubidium | 0.0161 | mg/l | 0.0144 | 10.6 | Oct. 17, 2002 |
| Selenium | <0.001 | mg/l | <0.001 | N/A | Oct. 17, 2002 |
| Silver | 0.001 | mg/l | <0.001 | N/A | Oct. 17, 2002 |
| Sodium | 122 | mg/l | 122 | 0.0 | Oct. 17, 2002 |
| Strontium | 0.162 | mg/l | 0.0136 | 91.6 | Oct. 17, 2002 |
| Tellurium | <0.001 | mg/l | <0.001 | N/A | Oct. 17, 2002 |
| Thallium | <0.0001 | mg/l | <0.0001 | N/A | Oct. 17, 2002 |
| Tin-Total | 0.0045 | mg/l | 0.0026 | 42.2 | Oct. 17, 2002 |
| Titanium | 0.128 | mg/l | 0.0023 | 98.2 | Oct. 17, 2002 |
| Tungsten | 0.0157 | mg/l | 0.0066 | 58.0 | Oct. 17, 2002 |
| Uranium | 0.0004 | mg/l | 0.0001 | 75.0 | Oct. 17, 2002 |
| Vanadium | <0.001 | mg/l | <0.001 | N/A | Oct. 17, 2002 |
| Zinc | 0.49 | mg/l | 0.05 | 89.8 | Oct. 17, 2002 |
| Zirconium | 0.0751 | mg/l | 0.0026 | 96.5 | Oct. 17, 2002 |
| pH | 7.6 | | 8.4 | | Oct. 16, 2002 |

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. A method for electro-coagulation treatment of contaminated water comprising:
providing an electrolytic cell including an anode and a helical cathode;
causing the contaminated water to come into contact with the cell;
applying a DC voltage across the anode and cathode of the cell so as to cause a current flow through the water so as to cause coagulation of contaminant particles in the contaminated water;
and extracting the coagulated particles from the contaminated water;
arranging the anode in the form of a central longitudinal member defining an outer anode surface surrounding the axis and extending along an axis of the cell;
arranging the helical cathode in the form of an elongate member coiled helically around and along the anode so as to form a plurality of turns of the elongate member which turns are wrapped around the anode surface;
and causing the cell to be automatically self cleaning by arranging the turns of the elongate member of the cathode so that the turns are spaced each from the next and are spaced from the anode surface so that the contaminated water flows both outside the turns of the helical cathode, between the turns of the helical cathode and inside the helical cathode between the turns of the helical cathode and the outer anode surface so that the coagulated particles are carried from the cell by the flow of the contaminated water.

2. The method according to claim 1 wherein the turns are of equal diameter so that the turns lie in a circular cylindrical shape surrounding the anode surface.

3. The method according to claim 1 wherein the turns are equally spaced each from the next to form a helix of constant pitch.

4. The method according to claim 1 wherein the anode surface is circular cylindrical in shape.

5. The method according to claim 1 wherein the anode is formed from a rod.

6. The method according to claim 1 wherein the elongate member forming the helical cathode is circular in cross section, 7. The method according to claim 1 wherein the elongate member forming the helical cathode is of constant cross section.

8. The method according to claim 1 wherein the cell is located longitudinally within a duct and the water is caused to flow along the duct.

9. The method according to claim 8 wherein the helical cathode is spaced from an inside surface of the duct such that the water is caused to flow between the helical cathode and the anode and between the helical cathode and the inside surface.

10. The method according to claim 8 wherein the helical cathode is spaced from an inside surface of the duct by a plurality of spacers arranged at specific angular locations around the helical cathode and attached to the helical cathode so as to bridge at least two turns of the elongate member.

11. The method according to claim 8 wherein the electro-coagulated treated water or waste water is transferred from an outlet of the duct to a separate flocculation or clarification tank where the coagulated precipitates are separated.

12. The method according to claim 11 wherein a portion of the water and coagulated precipitates is returned from the outlet of the duct to an inlet of the duct to maintain a predetermined flow through the duct.

13. The method according to claim 1 wherein each end of the anode and each end of the elongate member forming the helical cathode is connected to a source of DC voltage.

14. The method according to claim 1 wherein the diameter of the anode lies in the range of 25 mm to 300 mm.

15. The method according to claim 1 wherein the diameter of the elongate member forming the helical cathode lies in the range of 3 mm to 25 mm.

16. The method according to claim 1 wherein the spacing between the anode and the helical cathode lies in the range of 2 mm to 10 mm.

17. The method according to claim 1 wherein the spacing between the turns of the elongate member forming the cathode lies in the range of 2 mm to 20 mm.

18. The method according to claim 1 wherein the current density lies in the range of 50 watts to 2000 watts.

19. A method for forming hydrogen gas comprising:
providing an electrolytic cell including an anode and a helical cathode;
causing water to come into contact with the cell;
applying a DC voltage across the anode and cathode of the cell so as to cause a current flow through the water to form hydrogen gas at the cathode and to form coagulated particles;
collecting the hydrogen gas;
providing the anode in the form of a central longitudinal member defining an outer anode surface surrounding the axis and extending along an axis of the cell;
and providing the cathode in the form of a helical cathode which comprises an elongate member coiled helically around and along the anode so as to form a plurality of turns of the elongate member which turns are wrapped around the anode surface;
and causing the cell to be automatically self cleaning by arranging the turns of the elongate member of the cathode so that the turns are spaced each from the next and are spaced from the anode surface so that the water flows both outside the turns of the helical cathode, between the turns of the helical cathode and inside the helical cathode between the turns of the helical cathode and the outer anode surface so that the coagulated particles are carried from the cell by the flow of the water.

20. The method according to claim 19 wherein the cathode is formed such that the turns are of equal diameter so that the turns lie in a circular cylindrical shape surrounding the anode surface.

21. The method according to claim 19 wherein the cathode is formed such that the turns are equally spaced each from the next to form a helix of constant pitch.

22. The method according to claim 19 wherein the anode is formed such that the anode surface is circular cylindrical in shape.

23. The method according to claim 19 wherein the anode is formed from a rod.

24. The method according to claim 19 wherein the cathode is formed such that the elongate member forming the helical cathode is circular in cross section.

25. The method according to claim 19 wherein the cathode is formed such that the elongate member forming the helical cathode is of constant cross section.

26. The method according to claim 19 wherein the anode and cathode are arranged such that the cell is located longitudinally within a duct and the water is caused to flow along the duct.

27. The method according to claim 26 wherein the cathode is arranged such that the helical cathode is spaced from an inside surface of the duct such that the water is caused to flow between the helical cathode and the anode and between the helical cathode and the inside surface.

28. The method according to claim 26 wherein the cathode is arranged such that the helical cathode is spaced from an inside surface of the duct by a plurality of spacers arranged at specific angular locations around the helical cathode and attached to the helical cathode so as to bridge at least two turns of the elongate member.

29. The method according to claim 19 wherein each end of the anode and each end of the elongate member forming the helical cathode is connected to a source of DC voltage.

30. The method according to claim 19 wherein the anode is formed such that the diameter of the anode lies in the range of 25 mm to 300 mm.

31. The method according to claim 19 wherein the cathode is formed such that the diameter of the elongate member forming the helical cathode lies in the range of 3 mm to 25 mm.

32. The method according to claim 21 wherein the anode and cathode are formed such that the spacing between the anode and the helical cathode lies in the range of 2 mm to 10 mm.

33. The method according to claim 19 wherein the cathode is formed such that the spacing between the turns of the elongate member forming the cathode lies in the range of 2 mm to 20 mm.

34. The method according to claim 19 wherein the current density lies in the range of 50 watts to 2000 watts.

* * * * *